(12) United States Patent
Fischer et al.

(10) Patent No.: US 11,371,860 B2
(45) Date of Patent: Jun. 28, 2022

(54) METHOD AND APPARATUS FOR ADAPTIVE SCALING ROUTE DISPLAY

(71) Applicant: FORD GLOBAL TECHNOLOGIES, LLC, Dearborn, MI (US)

(72) Inventors: John Michael Fischer, Brighton, MI (US); Michael Lambert, Ann Arbor, MI (US); Adam Pagryzinski, Ypsilanti, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 181 days.

(21) Appl. No.: 16/688,620

(22) Filed: Nov. 19, 2019

(65) Prior Publication Data

US 2020/0088541 A1 Mar. 19, 2020

Related U.S. Application Data

(63) Continuation of application No. 15/496,650, filed on Apr. 25, 2017, now Pat. No. 10,488,217.

(51) Int. Cl.
| | |
|---|---|
| *G01C 21/36* | (2006.01) |
| *G01S 19/14* | (2010.01) |
| *G01S 19/13* | (2010.01) |
| *G01S 19/42* | (2010.01) |

(52) U.S. Cl.
CPC ....... *G01C 21/3676* (2013.01); *G01C 21/367* (2013.01); *G01S 19/13* (2013.01); *G01S 19/14* (2013.01); *G01S 19/42* (2013.01)

(58) Field of Classification Search
None
See application file for complete search history.

(56) References Cited

U.S. PATENT DOCUMENTS

| | | | | |
|---|---|---|---|---|
| 6,067,502 A | * | 5/2000 | Hayashida | G01C 21/367 701/428 |
| 9,052,212 B2 | | 6/2015 | Doan et al. | |
| 9,814,937 B2 | * | 11/2017 | Werner | A63B 24/0021 |
| 2005/0080556 A1 | * | 4/2005 | Toelle | G01C 21/3415 701/533 |
| 2008/0195313 A1 | * | 8/2008 | Coleman | G01C 21/3484 701/414 |
| 2008/0278314 A1 | * | 11/2008 | Miller | G07C 5/008 340/539.13 |
| 2011/0025715 A1 | | 2/2011 | Uchida et al. | |

* cited by examiner

*Primary Examiner* — Tamara L Weber
(74) *Attorney, Agent, or Firm* — Michael Spenner; Brooks Kushman P.C.

(57) ABSTRACT

A system includes a processor configured to display a traveled-portion of a route, responsive to a request, the traveled-portion representing an entire route traveled since the request was received, including scaling the display so that an entire route is included in a window of fixed size, regardless of how large a distance the displayed traveled-portion represents.

20 Claims, 4 Drawing Sheets

METHOD AND APPARATUS FOR ADAPTIVE SCALING ROUTE DISPLAY

CROSS-REFERENCE TO RELATED APPLICATIONS

This application is a continuation of U.S. application Ser. No. 15/496,650 filed Apr. 25, 2017, the disclosure of which is hereby incorporated in its entirety by reference herein.

TECHNICAL FIELD

The illustrative embodiments generally relate to methods and apparatuses for adaptive scaling route display.

BACKGROUND

Many navigation processes are capable of displaying a whole route or a portion of a route. When a whole route is displayed, however, it is typically at the onset of a route, before the route has been traveled. Once the vehicle gets underway, the process typically simply displays a portion of the route that is upcoming within a chosen map scale.

Further, the already-traveled portion of the route is almost never displayed, as it represents locations where the user has already been. Accordingly, most current navigation displays are not configured or suited to display data about where a user has been, as opposed to where a user is headed.

SUMMARY

In a first illustrative embodiment, a system includes a processor configured to display a traveled-portion of a route, responsive to a request, the traveled-portion representing an entire route traveled since the request was received, including scaling the display so that an entire route is included in a window of fixed size, regardless of how large a distance the displayed traveled-portion represents.

In a second illustrative embodiment, a computer-implemented method includes displaying a portion of a route already traveled by a vehicle in a window of fixed size, including scaling the displayed portion to accommodate an entire route, regardless of the distance which the route represents, responsive to a traveled-route display request.

In a third illustrative embodiment, a computer implemented method for scaling a display to accommodate a traveled-portion of a route, such that the entire traveled-portion of the route is displayed, includes receiving a GPS data point representing a next-point in a series of points comprising the traveled-portion. The method also includes determining an X translation and a Y translation that would accommodate a new traveled-portion, including the GPS data point, within a window of fixed size, currently including the displayed traveled-portion, responsive to determining that a line connecting the traveled-portion to the GPS data point would not remain in the window. The method further includes choosing one of the X translation and the Y translation as the basis for scaling. The method also includes switching the non-chosen translation to match the chosen translation. And the method includes scaling the displayed new traveled-portion according to the chosen translation and centering the displayed new traveled portion around whichever of the X and Y axis did not correspond to the chosen translation.

DETAILED DESCRIPTION

As required, detailed embodiments are disclosed herein; however, it is to be understood that the disclosed embodiments are merely illustrative and may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the claimed subject matter.

Figure 1:
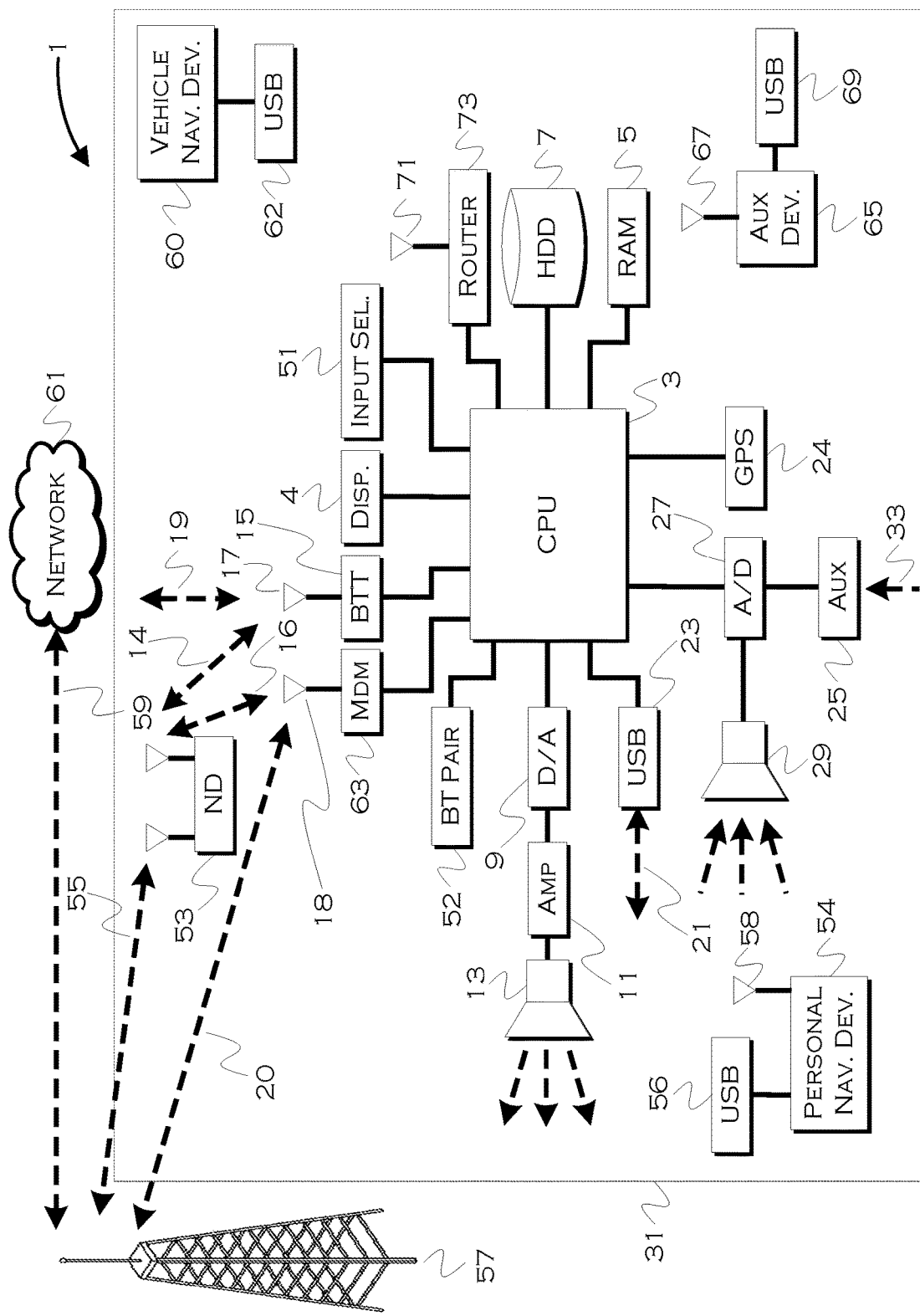
FIG. 1 shows an illustrative vehicle computing system.

FIG. 1 illustrates an example block topology for a vehicle based computing system 1 (VCS) for a vehicle 31. An example of such a vehicle-based computing system 1 is the SYNC system manufactured by THE FORD MOTOR COMPANY. A vehicle enabled with a vehicle-based computing system may contain a visual front end interface 4 located in the vehicle. The user may also be able to interact with the interface if it is provided, for example, with a touch sensitive screen. In another illustrative embodiment, the interaction occurs through, button presses, spoken dialog system with automatic speech recognition and speech synthesis.

In the illustrative embodiment 1 shown in FIG. 1, a processor 3 controls at least some portion of the operation of the vehicle-based computing system. Provided within the vehicle, the processor allows onboard processing of commands and routines. Further, the processor is connected to both non-persistent 5 and persistent storage 7. In this illustrative embodiment, the non-persistent storage is random access memory (RAM) and the persistent storage is a hard disk drive (HDD) or flash memory. In general, persistent (non-transitory) memory can include all forms of memory that maintain data when a computer or other device is powered down. These include, but are not limited to, HDDs, CDs, DVDs, magnetic tapes, solid state drives, portable USB drives and any other suitable form of persistent memory.

The processor is also provided with a number of different inputs allowing the user to interface with the processor. In this illustrative embodiment, a microphone 29, an auxiliary input 25 (for input 33), a USB input 23, a GPS input 24, screen 4, which may be a touchscreen display, and a BLUETOOTH input 15 are all provided. An input selector 51 is also provided, to allow a user to swap between various inputs. Input to both the microphone and the auxiliary connector is converted from analog to digital by a converter 27 before being passed to the processor. Although not shown, numerous of the vehicle components and auxiliary components in communication with the VCS may use a vehicle network (such as, but not limited to, a CAN bus) to pass data to and from the VCS (or components thereof).

Outputs to the system can include, but are not limited to, a visual display 4 and a speaker 13 or stereo system output.

The speaker is connected to an amplifier 11 and receives its signal from the processor 3 through a digital-to-analog converter 9. Output can also be made to a remote BLUETOOTH device such as PND 54 or a USB device such as vehicle navigation device 60 along the bi-directional data streams shown at 19 and 21 respectively.

In one illustrative embodiment, the system 1 uses the BLUETOOTH transceiver 15 to communicate 17 with a user's nomadic device 53 (e.g., cell phone, smart phone, PDA, or any other device having wireless remote network connectivity). The nomadic device can then be used to communicate 59 with a network 61 outside the vehicle 31 through, for example, communication 55 with a cellular tower 57. In some embodiments, tower 57 may be a WiFi access point.

Exemplary communication between the nomadic device and the BLUETOOTH transceiver is represented by signal 14.

Pairing a nomadic device 53 and the BLUETOOTH transceiver 15 can be instructed through a button 52 or similar input. Accordingly, the CPU is instructed that the onboard BLUETOOTH transceiver will be paired with a BLUETOOTH transceiver in a nomadic device.

Data may be communicated between CPU 3 and network 61 utilizing, for example, a data-plan, data over voice, or DTMF tones associated with nomadic device 53. Alternatively, it may be desirable to include an onboard modem 63 having antenna 18 in order to communicate 16 data between CPU 3 and network 61 over the voice band. The nomadic device 53 can then be used to communicate 59 with a network 61 outside the vehicle 31 through, for example, communication 55 with a cellular tower 57. In some embodiments, the modem 63 may establish communication 20 with the tower 57 for communicating with network 61. As a non-limiting example, modem 63 may be a USB cellular modem and communication 20 may be cellular communication.

In one illustrative embodiment, the processor is provided with an operating system including an API to communicate with modem application software. The modem application software may access an embedded module or firmware on the BLUETOOTH transceiver to complete wireless communication with a remote BLUETOOTH transceiver (such as that found in a nomadic device). Bluetooth is a subset of the IEEE 802 PAN (personal area network) protocols. IEEE 802 LAN (local area network) protocols include WiFi and have considerable cross-functionality with IEEE 802 PAN. Both are suitable for wireless communication within a vehicle. Another communication means that can be used in this realm is free-space optical communication (such as IrDA) and non-standardized consumer IR protocols.

In another embodiment, nomadic device 53 includes a modem for voice band or broadband data communication. In the data-over-voice embodiment, a technique known as frequency division multiplexing may be implemented when the owner of the nomadic device can talk over the device while data is being transferred. At other times, when the owner is not using the device, the data transfer can use the whole bandwidth (300 Hz to 3.4 kHz in one example). While frequency division multiplexing may be common for analog cellular communication between the vehicle and the internet, and is still used, it has been largely replaced by hybrids of Code Domain Multiple Access (CDMA), Time Domain Multiple Access (TDMA), Space-Domain Multiple Access (SDMA) for digital cellular communication. If the user has a data-plan associated with the nomadic device, it is possible that the data-plan allows for broad-band transmission and the system could use a much wider bandwidth (speeding up data transfer). In still another embodiment, nomadic device 53 is replaced with a cellular communication device (not shown) that is installed to vehicle 31. In yet another embodiment, the ND 53 may be a wireless local area network (LAN) device capable of communication over, for example (and without limitation), an 802.11g network (i.e., WiFi) or a WiMax network.

In one embodiment, incoming data can be passed through the nomadic device via a data-over-voice or data-plan, through the onboard BLUETOOTH transceiver and into the vehicle's internal processor 3. In the case of certain temporary data, for example, the data can be stored on the HDD or other storage media 7 until such time as the data is no longer needed.

Additional sources that may interface with the vehicle include a personal navigation device 54, having, for example, a USB connection 56 and/or an antenna 58, a vehicle navigation device 60 having a USB 62 or other connection, an onboard GPS device 24, or remote navigation system (not shown) having connectivity to network 61. USB is one of a class of serial networking protocols. IEEE 1394 (FireWire™ (Apple), i.LINK™ (Sony), and Lynx™ (Texas Instruments)), EIA (Electronics Industry Association) serial protocols, IEEE 1284 (Centronics Port), S/PDIF (Sony/Philips Digital Interconnect Format) and USB-IF (USB Implementers Forum) form the backbone of the device-device serial standards. Most of the protocols can be implemented for either electrical or optical communication.

Further, the CPU could be in communication with a variety of other auxiliary devices 65. These devices can be connected through a wireless 67 or wired 69 connection. Auxiliary device 65 may include, but are not limited to, personal media players, wireless health devices, portable computers, and the like.

Also, or alternatively, the CPU could be connected to a vehicle based wireless router 73, using for example a WiFi (IEEE 803.11) 71 transceiver. This could allow the CPU to connect to remote networks in range of the local router 73.

In addition to having exemplary processes executed by a vehicle computing system located in a vehicle, in certain embodiments, the exemplary processes may be executed by a computing system in communication with a vehicle computing system. Such a system may include, but is not limited to, a wireless device (e.g., and without limitation, a mobile phone) or a remote computing system (e.g., and without limitation, a server) connected through the wireless device. Collectively, such systems may be referred to as vehicle associated computing systems (VACS). In certain embodiments particular components of the VACS may perform particular portions of a process depending on the particular implementation of the system. By way of example and not limitation, if a process has a step of sending or receiving information with a paired wireless device, then it is likely that the wireless device is not performing that portion of the process, since the wireless device would not "send and receive" information with itself. One of ordinary skill in the art will understand when it is inappropriate to apply a particular computing system to a given solution.

In each of the illustrative embodiments discussed herein, an exemplary, non-limiting example of a process performable by a computing system is shown. With respect to each process, it is possible for the computing system executing the process to become, for the limited purpose of executing the process, configured as a special purpose processor to perform the process. All processes need not be performed in their entirety, and are understood to be examples of types of processes that may be performed to achieve elements of the invention. Additional steps may be added or removed from the exemplary processes as desired.

With respect to the illustrative embodiments described in the figures showing illustrative process flows, it is noted that a general purpose processor may be temporarily enabled as a special purpose processor for the purpose of executing some or all of the exemplary methods shown by these figures. When executing code providing instructions to perform some or all steps of the method, the processor may be temporarily repurposed as a special purpose processor, until such time as the method is completed. In another example, to the extent appropriate, firmware acting in accordance with a preconfigured processor may cause the processor to act as a special purpose processor provided for the purpose of performing the method or some reasonable variation thereof.

The illustrative embodiments are presented with respect to aspects of a mobile and/or vehicular application that allows a user to record, track and view various aspects of a vehicle race. The race could be run on a street or track, the application allows the user to track and record race-related data regardless of the environment in which the user is operating.

While the illustrative processes are described with respect to such an application, they may also have general vehicular applicability and are not always confined to applicability in a race-related setting. For example, without limitation, vehicle data, timing data, route data, track data and other recorded and playback-able data could all be recorded and viewed relating generally to any route or path, and this data could also be used to support other illustrative functionality, such as navigation improvements.

The illustrative embodiments relate to a scaling, adaptive route display. As a vehicle travels, the route is displayed in a scalable window. While the actual size of the window may not scale, the zoom of the window can adaptively scale to accommodate a display of the entire route as it forms (the display representing an already-traveled portion of a route). This allows a user to see a complete path of a travel for portions of a route already traveled. The display can also scale to accommodate other data points, such as display of a ghost-vehicle (if ahead of the present vehicle on a route) and/or a start/finish line. The scaling proposed herein attempts to keep the displayed route as large as possible, by restrictively zooming to keep the route displayed while not over-zooming out and displaying the route as too minimal of a portion of the display.

Figure 2:
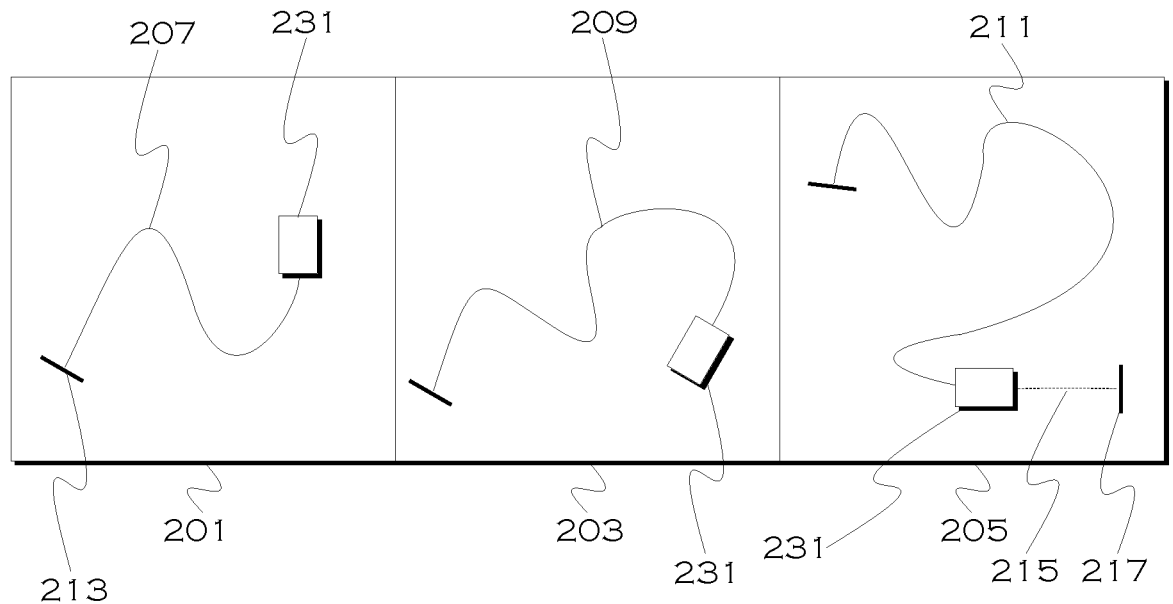
FIG. 2 shows three views of an adaptive route display, zooming to incorporate display of an entire route.

FIG. 2 shows three views of an adaptive route display, zooming to incorporate display of an entire route. In the display 201, a start line 213, a route-traveled 207 and a current position 231 are shown, occupying a predetermined portion of the displayed window. The user has already driven the portion 207, and as the user moves forward, the window will zoom out to accommodate the whole route.

The second window 203 shows the user having traveled further along the route 209, which includes the portion 207 and a further portion traveled. The vehicle 231 has moved along the route and the window has been zoomed to accommodate the route, while still keeping the route as large as desired within the displayed window.

The third window 205 shows an even further position along the route 211. The vehicle 231 is now within a predetermined distance of a finish line 217. Accordingly, a data point for the finish line has been added to the displayed information, and the display has been zoomed to accommodate both the traveled portion of the route and the remaining route 215 and finish line 217. The displayed data still occupies the predetermined or desired portion of the displayed window, as the zoom has adapted all along based on the actual data, as opposed to simply fixedly zooming out on both axes as time or the vehicle progresses.

Figure 3:
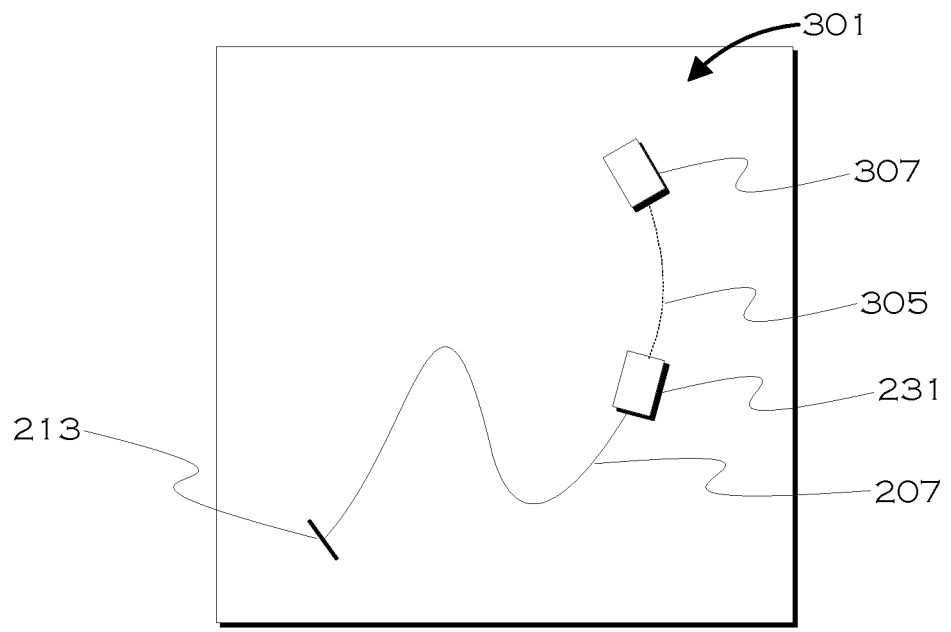
FIG. 3 shows a view of the adaptive route display, zooming to incorporate additional route-related data.

FIG. 3 shows a view of the adaptive route display, zooming to incorporate additional route-related data. This is an alternative view 301 of what was seen in display 201, and in this example the displayed data includes a ghost car 307. The ghost car represents a previous trip along the path, a competitor trip along the path, a best time along the path or other data point acting as a pace car representing data. Since the ghost car is ahead of the user 231, the process has zoomed the displayed window to include a path 305 ahead and the ghost car 307. Any relevant data points can be added as needed. If the user overtakes the ghost car, the rate of zoom may temporarily slow, since the window will have already accommodated for the path ahead.

It is worth noting that if the user is driving in a circle, for example, the display will remain at a largely fixed perspective once the circle has been completed once. The user could drive in twenty circles without a zoom, then suddenly veer off in one direction and the display could begin to adapt again as the route traveled threatens to breach an edge of the display.

Figure 4:
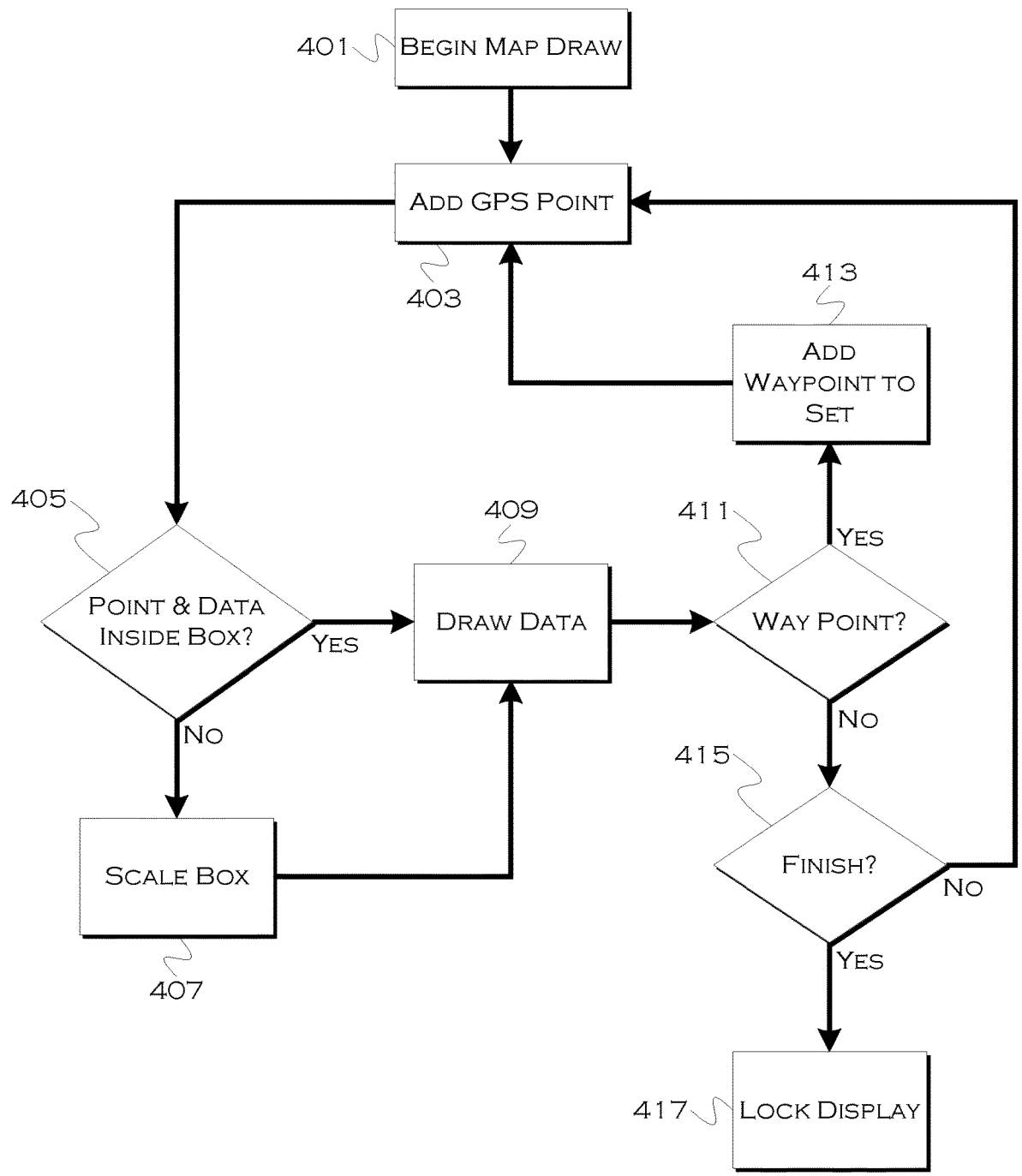
FIG. 4 shows an illustrative process for display scaling to accommodate a growing route and data points.

FIG. 4 shows an illustrative process for display scaling to accommodate a growing route and data points. In this example, the process begins drawing 401 the displayed route as the user begins traveling. As noted, the route tracks where the user has been, and the display zooms to accommodate the user.

Whenever a new GPS point is recorded (as the vehicle travels), the process adds 403 the GPS point to a data set representing the route displayed. The route displayed is essentially a line connecting a series of recorded GPS data points.

The process determines 405 whether or not the current GPS data point and a line connecting to the GPS data point from the last GPS data point will remain inside the display window. If any of the data will fall outside the displayed window (or, for example, within a fixed margin framing the window), the process may scale 407 the display (by zooming out along at least one axis).

Once the process scales the window sufficiently to contain the new data, the process may draw 409 a path line to the newly recorded GPS datapoint displayed within the window. The window may be a simply display, lacking any features other than the actual route, for example. As such, the GPS coordinates serve to provide relative point positioning, as the relative position of each point is determinable related to each other point.

Since extra data points may also be accommodated by the display, the process may also determine 411 if there is a waypoint (finish line, pit stop, ghost car, etc) to be added to the display. If there is a waypoint, the process adds 413 the waypoint (or ghost car data GPS location value) to the data set for consideration by the scaling process.

Until the race or route reaches a finish point 415, the process can continue adding GPS data points and waypoint GPS data points and scaling accordingly. Once the route finishes (or a race finishes), the process may lock 417 the scale of the display, so that the display does not continue recording data unrelated to a race or route.

Figure 5:
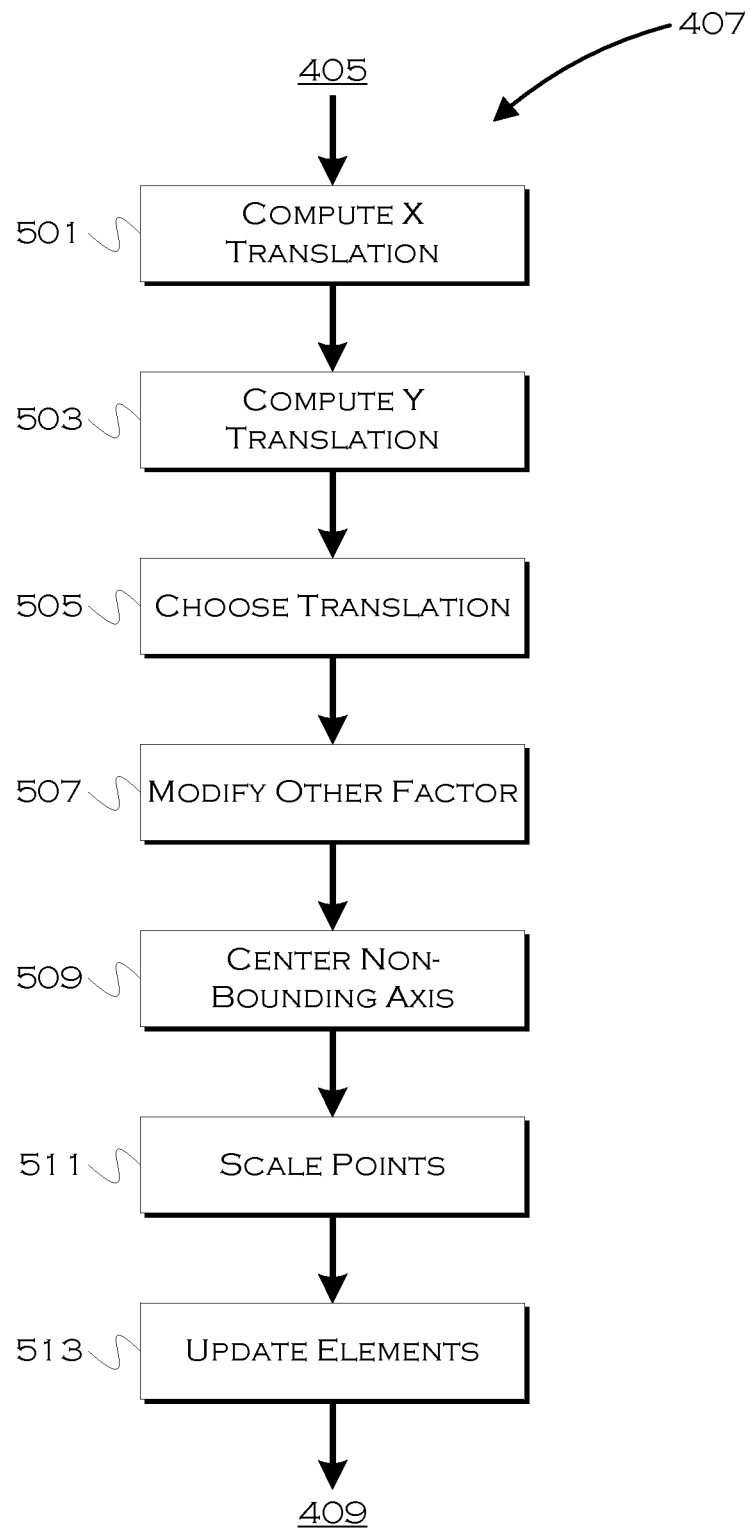
FIG. 5 shows an illustrative process for display scaling determination.

FIG. 5 shows an illustrative process for display scaling determination. This represents one non-limiting example of scaling the display in a manner that still accommodates the displayed route fully. When the display process determines 405 that scaling is needed, the process computes individual translations for each of the X and Y axis.

The process computes 501 an X axis translation that will fully accommodate the new route within the X vector. The process computes 503 a Y axis translation that will fully accommodate the new route within the Y vector. The process in this example chooses 505 a particular translation along one axis to use, in this case the smaller translation. Since both translations may not be the same, and to preserve the route shape, the process may then modify 507 the scale factor along the other axis to match the chosen translation.

The process then centers 509 the display based on the non-bounding axis. The process then uses the chosen translation to scale 511 the recorded data set. This will allow the whole path to be redrawn while preserving the general shape and dimensions of the displayed path, and using the chosen scale factor effectively zooms the window (from a visual standpoint) based on the chosen translation factor. The process also updates 513 any elements displayed within the window, based on the translation factor. The process can then proceed with route output 409.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined in logical manners to produce situationally suitable variations of embodiments described herein.

What is claimed is:

1. A system comprising:
   a processor configured to:
   detect GPS coordinate information for a traveling vehicle at predetermined intervals;
   add detected GPS coordinates to a displayed route displayed on a vehicle display, such that a line connecting contiguous coordinates represents an entire route traveled up until the last detected GPS coordinate, at any moment;
   determine that, based on a present scale of the line and a fixed display window size, the line will not fit within the fixed display window because a most-recently detected GPS coordinate will cause the line to exceed a display window boundary in at least one direction when the line connects the contiguous coordinates including the most-recently detected coordinate; and
   responsive to the determination that the line will exceed the display window, adjust the scale of the line to preserve a view of the entire line within the display window.

2. The system of claim 1, wherein the line will exceed the display window along an X-axis.

3. The system of claim 1, wherein the line will exceed the display window along a Y-axis.

4. The system of claim 1, wherein the processor is configured to display a secondary coordinate point, having a GPS coordinate set associated therewith, within the display window, the secondary coordinate point disconnected from the line and distinct from the line.

5. The system of claim 4, wherein the processor is configured to adjust a displayed scale of the line such that the line and second coordinate point are both displayed within the display window, while accurately preserving a relative distance relationship between coordinate points comprising the line and the secondary coordinate point.

6. The system of claim 4, wherein the secondary coordinate point includes a predefined finish point.

7. The system of claim 4, wherein the secondary coordinate point includes a pit stop point.

8. The system of claim 4, wherein the secondary coordinate point includes a point representing previous travel of a vehicle along a same route represented by the line.

9. The system of claim 1, wherein the processor is configured to adjust the scale of the line by choosing a translation along which of an X or Y axis that the line is projected to exceed the display.

10. The system of claim 9, wherein the processor is configured to scale the line based on the chosen translation along the X or Y axis such that the line remains fully within the display along the X or Y axis.

11. The system of claim 10, wherein the processor is configured to scale the line based on the chosen translation along the other of the X or Y axis along which the line was not previously scaled based on the chosen translation, such that the overall shape of the line does not change as the result of scaling along only one axis.

12. The system of claim 11, wherein the processor is configured to center the scaled line along the other of the X or Y axis that was not chosen based on the chosen translation.

13. A method comprising:
   detecting, via a vehicle, GPS coordinate information for a traveling vehicle at predetermined intervals;
   adding detected GPS coordinates to a displayed route displayed on a vehicle display, such that a line connecting contiguous coordinates represents an entire route traveled up until the last detected GPS coordinate, at any moment;
   determining that, based on a present scale of the line and a fixed display window size, the line will not fit within the fixed display window because a most-recently detected GPS coordinate will cause the line to exceed a display window boundary in at least one direction when the line connects the contiguous coordinates including the most-recently detected coordinate; and
   responsive to the determination that the line will exceed the display window, adjusting the scale of the line to preserve a view of the entire line within the display window.

14. The method of claim 13, wherein the line will exceed the display window along an X-axis.

15. The method of claim 13, wherein the line will exceed the display window along a Y-axis.

16. The method of claim 13, further comprising displaying a secondary coordinate point, having a GPS coordinate set associated therewith, within the display window, the secondary coordinate point disconnected from the line, distinct from the line and displayed at a position within the display window that preserves a relative distance between the coordinate points comprising the line and the GPS coordinate set associated with the secondary coordinate point.

17. A non-transitory computer readable storage medium, storing instructions that, when executed by a processor of a vehicle, cause the processor to perform a method comprising:
   detecting GPS coordinate information for a traveling vehicle at predetermined intervals;
   adding detected GPS coordinates to a displayed route displayed on a vehicle display, such that a line connecting contiguous coordinates represents an entire route traveled up until the last detected GPS coordinate, at any moment;

determining that, based on a present scale of the line and a fixed display window size, the line will not fit within the fixed display window because a most-recently detected GPS coordinate will cause the line to exceed a display window boundary in at least one direction when the line connects the contiguous coordinates including the most-recently detected coordinate; and responsive to the determination that the line will exceed the display window, adjusting the scale of the line to preserve a view of the entire line within the display window.

18. The storage medium of claim 17, wherein the line will exceed the display window along an X-axis.

19. The storage medium of claim 17, wherein the line will exceed the display window along a Y-axis.

20. The storage medium of claim 17, the method further comprising displaying a secondary coordinate point, having a GPS coordinate set associated therewith, within the display window, the secondary coordinate point disconnected from the line, distinct from the line and displayed at a position within the display window that preserves a relative distance between the coordinate points comprising the line and the GPS coordinate set associated with the secondary coordinate point.

* * * * *